United States Patent
Sim et al.

(10) Patent No.: US 9,204,202 B2
(45) Date of Patent: Dec. 1, 2015

(54) METHODS FOR INCREASING A NUMBER OF MEDIA PLAYBACK DEVICES SERVED BY A COMMUNICATIONS BASE STATION

(75) Inventors: Wong Hoo Sim, Singapore (SG); Zi Kai Koh, Singapore (SG); Yam Fei Lian, Singapore (SG)

(73) Assignee: Creative Technology Ltd, Singapore (SG)

( * ) Notice: Subject to any disclaimer, the term of this patent is extended or adjusted under 35 U.S.C. 154(b) by 224 days.

(21) Appl. No.: 13/698,484

(22) PCT Filed: Apr. 18, 2011

(86) PCT No.: PCT/SG2011/000152
§ 371 (c)(1),
(2), (4) Date: Jan. 14, 2013

(87) PCT Pub. No.: WO2011/146016
PCT Pub. Date: Nov. 24, 2011

(65) Prior Publication Data
US 2013/0212612 A1  Aug. 15, 2013

(30) Foreign Application Priority Data

May 17, 2010  (SG) .................................. 201003425

(51) Int. Cl.
| | |
|---|---|
| *H04N 7/16* | (2011.01) |
| *H04N 21/637* | (2011.01) |
| *H04L 12/24* | (2006.01) |
| *H04N 21/61* | (2011.01) |
| *H04N 21/643* | (2011.01) |
| *H04N 21/266* | (2011.01) |
| *H04N 21/6405* | (2011.01) |
| *H04L 12/18* | (2006.01) |
| *H04W 12/06* | (2009.01) |
| *H04W 76/04* | (2009.01) |

(52) U.S. Cl.
CPC ............ *H04N 21/637* (2013.01); *H04L 12/189* (2013.01); *H04L 41/0816* (2013.01); *H04N 21/26616* (2013.01); *H04N 21/6131* (2013.01); *H04N 21/643* (2013.01); *H04N 21/6405* (2013.01); *H04L 41/0896* (2013.01); *H04W 12/06* (2013.01); *H04W 76/04* (2013.01)

(58) Field of Classification Search
CPC .......................... H04N 21/4532; H04N 7/163
See application file for complete search history.

(56) References Cited

U.S. PATENT DOCUMENTS

| | | | |
|---|---|---|---|
| 2006/0010472 A1* | 1/2006 | Godeny ........................... | 725/62 |
| 2006/0218227 A1* | 9/2006 | Spear ............................ | 709/203 |

(Continued)

FOREIGN PATENT DOCUMENTS

WO    WO 2008153474 A1 * 12/2008 .............. H04W 4/06

*Primary Examiner* — Nathan Flynn
*Assistant Examiner* — Alfonso Castro
(74) *Attorney, Agent, or Firm* — Russell Swerdon; Desmund Gean

(57) ABSTRACT

There is provided methods for increasing a number of media playback devices served by a communications base station. The communications base station may be for transmitting data using a broadcast video band frequency and both transmitting and receiving data using a mobile broadband frequency. The methods enable the communications base station to serve a greater number of media playback devices in the idle mode compared to a lesser number of media playback devices in the active mode. Both the broadcast video band frequency and the mobile broadband frequency may be a data network such as, for example, WiMAX, HSxPA, HSPA+, LTE and so forth.

17 Claims, 2 Drawing Sheets

(56) References Cited

U.S. PATENT DOCUMENTS

| | | | |
|---|---|---|---|
| 2007/0217440 A1* | 9/2007 | Cho et al. | 370/431 |
| 2008/0076359 A1* | 3/2008 | Charpentier et al. | 455/63.1 |
| 2008/0253322 A1* | 10/2008 | So et al. | 370/329 |
| 2009/0052364 A1* | 2/2009 | Gonsa et al. | 370/312 |
| 2009/0190757 A1* | 7/2009 | Chen et al. | 380/242 |
| 2010/0161756 A1* | 6/2010 | Lewis et al. | 709/217 |
| 2011/0013549 A1* | 1/2011 | Urie | 370/312 |
| 2011/0149834 A1* | 6/2011 | Jamadagni | 370/312 |
| 2011/0201341 A1* | 8/2011 | Choudhury et al. | 455/450 |
| 2012/0079605 A1* | 3/2012 | Bolin et al. | 726/27 |

\* cited by examiner

METHODS FOR INCREASING A NUMBER OF MEDIA PLAYBACK DEVICES SERVED BY A COMMUNICATIONS BASE STATION

FIELD OF INVENTION

The present invention relates to the field of distribution of media content, primarily in relation to methods for increasing a number of media playback devices served by a communications base station.

BACKGROUND

The development and widespread availability of high bandwidth wireless networks has led to voluminous amounts of digital data being transmitted wirelessly as the high bandwidth and wireless nature enables the transmission of the digital data to be carried out conveniently for the user. However, there are currently difficulties in relation to accommodating/meeting data transmission expectations for an increasing number of users as the development of data transmission infrastructure requires time (for both planning and implementation) and substantial financial investment.

In a typical metropolis in any country, a high number of high rise buildings inevitably leads to a high population density. Correspondingly, the high population density in the metropolis typically denotes a high number of users of data networks within a small area of real estate. When the high number of users simultaneously use the data networks, the "sharing bandwidth among users" method of apportioning bandwidth typically leads to undesirable user experiences ranging from, for example, data lag, dropped signals, data security breaches, and so forth.

Data networks typically rely on the use of communications base stations as relays to allow users to access the data networks from different physical locations. However, each of the communications base stations typically is able to serve a pre-determined number of users, and this consequently limits the number of users who are able to access the data network in a desirable manner.

In this regard, it is desirable to make enhancements to the communications base stations in order to increase the number of users who are able to access the data network in a desirable manner.

SUMMARY

In a first aspect, there is provided a method for increasing a number of media playback devices served by a communications base station. The communications base station may be for transmitting data using a broadcast video band frequency and both transmitting and receiving data using a mobile broadband frequency. The method includes receiving log-in communications from a first media playback device at the communications base station on the mobile broadband frequency, the first media playback device being in an active mode during the log-in communications; receiving broadcast video content instructions from the first media playback device at the communications base station on the mobile broadband frequency after the first media playback device is able to access a data network served by the communications base station; toggling the first media playback device to an idle mode; and transmitting media content to the first media playback device on the broadcast video band frequency when the first media playback device is in the idle mode.

It is advantageous that the communications base station is able to serve a greater number of media playback devices in the idle mode compared to a lesser number of media playback devices in the active mode. Both the broadcast video band frequency and the mobile broadband frequency may be a data network such as, for example, WiMAX, HSxPA, HSPA+, LTE and so forth.

The log-in communications may include both network entry and authentication processes. Preferably, the broadcast video content instructions include information on video channels such as, for example, frequency, decryption key, video parameters for each video channel and the like.

The first media playback device may both transmit and receive data in the active mode, and may only receive data in the idle mode. The first media playback device may be a device such as, for example, a mobile phone, a media player, an e-book reader, a desktop computer, a portable computer and the like. Toggling the first media playback device from the active mode to the idle mode may be carried out either when the first media playback device transmits the broadcast video content instructions or manually by a user of the first media playback device. Transmitting the broadcast video content instructions from the first media playback device may cause an acknowledgement signal to be sent from the communications base station when the broadcast video content instructions are received at the communications base station. Preferably, the transmission of media content to the first media playback device on the broadcast video band frequency is via a downlink broadcast. The media content transmitted to the first playback device may be stored in cache memory of the first media playback device for lag-less playback of the media content on the first playback device.

A communications base station may advantageously use the method of the first aspect to increase a number of media playback devices served by the communications base station.

In a second aspect, there is provided another method for increasing a number of media playback devices served by a communications base station. The communications base station may be for transmitting data using a broadcast video band frequency and both transmitting and receiving data using a mobile broadband frequency. The method includes transmitting log-in communications from a first media playback-device to the communications base station on the mobile broadband frequency, the first media playback device being in an active mode during the log-in communications; transmitting broadcast video content instructions from the first media playback device to the communications base station on the mobile broadband frequency after the first media playback device is able to access a data network served by the communications base station; toggling the first media playback device to an idle mode; and receiving media content at the first media playback device on the broadcast video band frequency when the first media playback device is in the idle mode.

It is advantageous that a greater number of media playback devices in the idle mode is able to served by the communications base station compared to a lesser number of media playback devices in the active mode. Both the broadcast video band frequency and the mobile broadband frequency may be a data network such as, for example, WiMAX, HSxPA, HSPA+, LTE and so forth.

The log-in communications may include both network entry and authentication processes. Preferably, the broadcast video content instructions include information on video channels such as, for example, frequency, decryption key, and video parameters for each video channel and the like.

The first media playback device may both transmit and receive data in the active mode, and only receive data in the idle mode. The first media playback device may be a device such as, for example, a mobile phone, a media player, an e-book reader, a desktop computer, a portable computer and so forth. Toggling the first media playback device from the active mode to the idle mode may be carried out either when the first media playback device transmits the broadcast video content instructions or manually by a user of the first media playback device. Transmitting the broadcast video content instructions from the first media playback device may cause an acknowledgement signal to be sent from the communications base station when the broadcast video content instructions are received at the communications base station. Preferably, the transmission of media content to the first media playback device on the broadcast video band frequency is via a downlink broadcast. The media content received at the first playback device may be stored in cache memory of the first media playback device for lag-less playback of the media content on the first playback device.

A media playback device may advantageously use the method of the second aspect to increase a number of media playback devices served by a communications base station.

DESCRIPTION OF FIGURES

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

The present invention relates to various aspects of the distribution of media content over a wireless network, such as, a transmission aspect, a reception aspect and a system aspect. Further details of the aforementioned various aspects are provided in subsequent paragraphs of this section.

Figure 1:
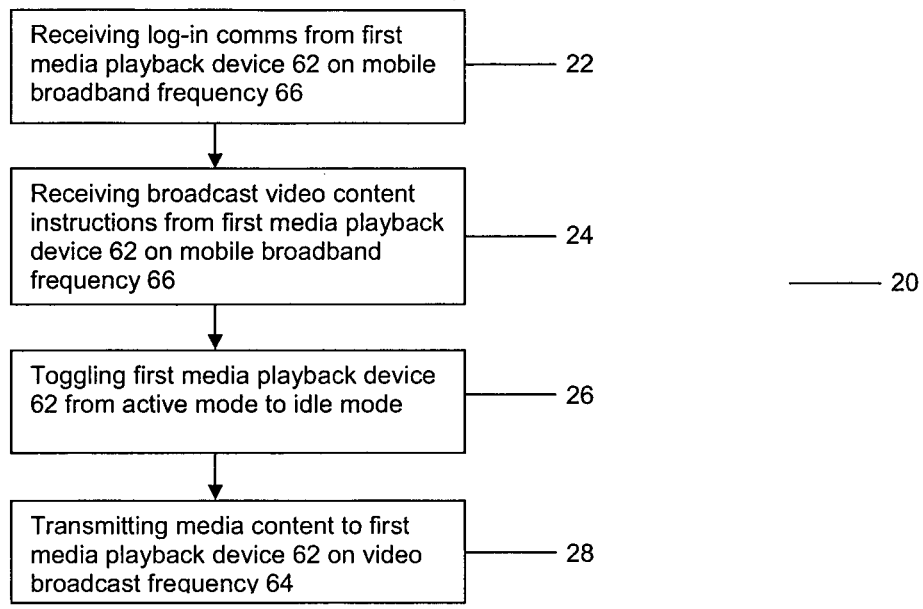
FIG. 1 shows a process flow for a first method for the present invention.
Figure 3:
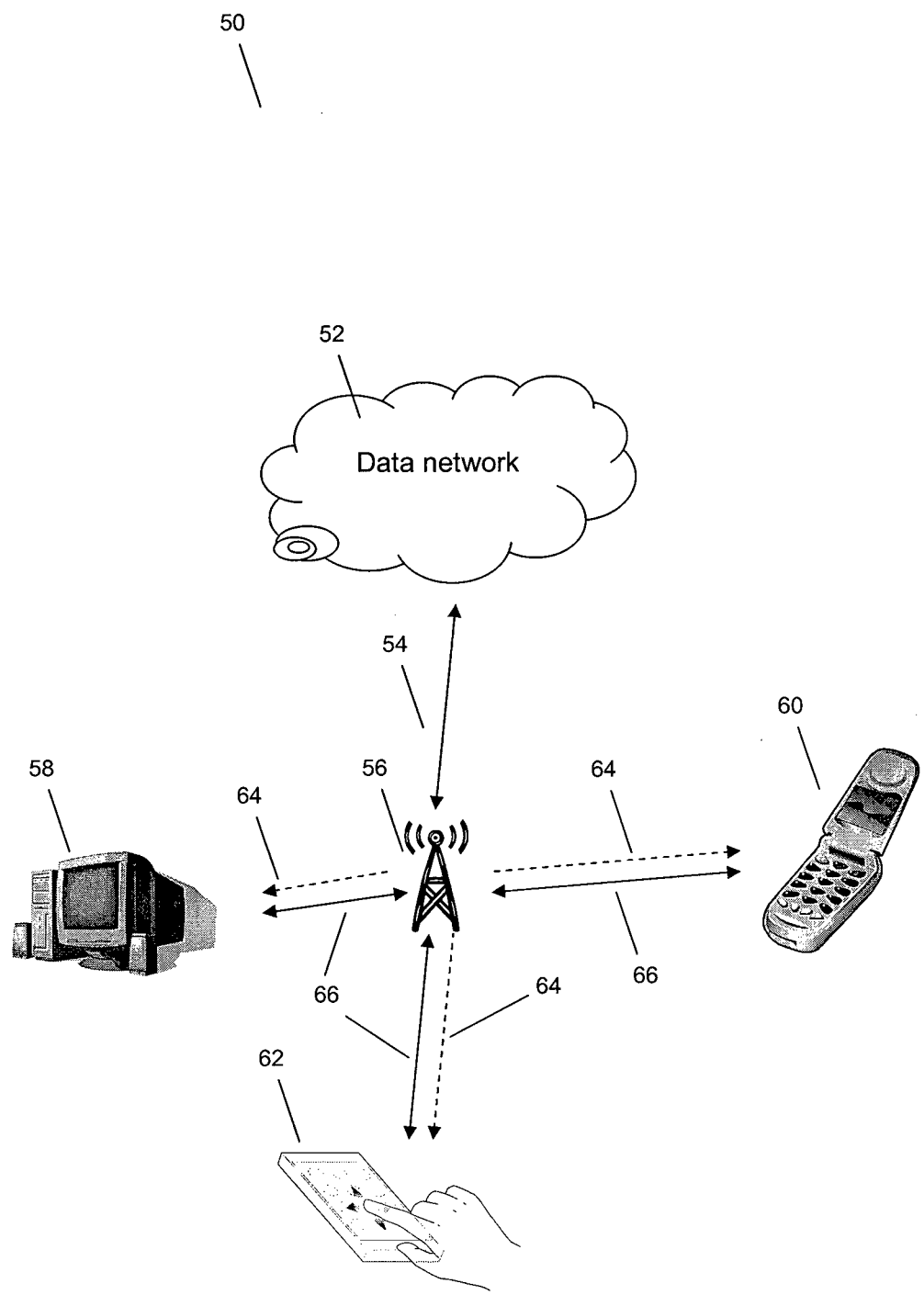
FIG. 3 shows an overview of a system for enabling the methods of FIGS. 1 and 2.

Reference is made to FIGS. 1 and 3 in relation to a method 20 for increasing a number of media playback devices (58, 60, 62) served by a communications base station 56. FIG. 1 shows a process flow of the method 20 while FIG. 3 shows a system 50 which enables the method 20. It is appreciated that the communications base station 56 refers to a hub which allows users to access a data network 52, and may be configured to transmit data using a broadcast video band frequency 64 and both transmit and receive data using a mobile broadband frequency 66. Both the broadcast video band frequency 64 and the mobile broadband frequency 66 are selected from a data network such as, for example, WiMAX, HSxPA, HSPA+, LTE and so forth. In addition, the first media playback device may be a device such as, for example, a mobile phone (60 in FIG. 3), a media player (62 in FIG. 3), an e-book reader, a desktop computer (58 in FIG. 3), a portable computer and so forth. The first media playback device may be able to both transmit and receive data in an active mode, and only receive data in an idle mode.

The method 20 includes receiving log-in communications from the first media playback device (any one of 58, 60, 62) at the communications base station 56 on the mobile broadband frequency 66 (22), with the first media playback device (any one of 58, 60, 62) being in the active mode during the log-in communications. The log-in communications may include both network entry and authentication processes. The log-in communications may enable a user of the first media playback device (any one of 58, 60, 62) to access the data network 52.

Subsequently, the method 20 includes receiving broadcast video content instructions from the first media playback device (any one of 58, 60, 62) at the communications base station 56 on the mobile broadband frequency 66 after the first media playback device (any one of 58, 60, 62) is able to access the data network 52 served by the communications base station 56 (24). It is appreciated that the broadcast video content instructions include information on video channels such as, for example, frequency, decryption key, video parameters for each video channel and so forth. It is appreciated that the information on video channels may be stored in a configuration (config) file, the config file being stored at the communications base station 56. In this regard, varying the information on video channels stored in the config file would affect at least one of the video channels. It is appreciated that the decryption key may be renewable after a pre-determined period of time for digital rights management issues. The decryption key may also be locked-in with the first media playback device (any one of 58, 60, 62) in order to prevent unauthorized distribution of the decryption key.

The method 20 then includes toggling the first media playback device (any one of 58, 60, 62) to the idle mode (26). Toggling the first media playback device (any one of 58, 60, 62) from the active mode to the idle mode may be carried out either when the first media playback device (any one of 58, 60, 62) transmits the broadcast video content instructions to the communications base station 56 or manually by a user of the first media playback device (any one of 58, 60, 62).

One manner of toggling the mode of the first media playback device (any one of 58, 60, 62) would be where the first media playback device (any one of 58, 60, 62) toggled (possibly by software) from the active mode to the idle mode at a juncture where the broadcast video content instructions are transmitted from the first media playback device (any one of 58, 60, 62). Alternatively, transmitting the broadcast video content instructions from the first media playback device (any one of 58, 60, 62) may cause an acknowledgement signal to be sent from the communications base station 56 when the broadcast video content instructions are received at the communications base station 56, and receipt of the acknowledgement signal from by the first media playback device (any one of 58, 60, 62) may cause the first media playback device (any one of 58, 60, 62) to be toggled to the idle mode (possibly also by software).

In relation to an example for the manual toggling of the modes, the user of the first media playback device (any one of 58, 60, 62) may be prompted by any means to toggle the first media playback device (any one of 58, 60, 62) to the idle mode at a juncture when the broadcast video content instructions are transmitted to the communications base station 56.

The method 20 then includes transmitting media content to the first media playback device (any one of 58, 60, 62) on the broadcast video band frequency 64 when the first media playback device (any one of 58, 60, 62) is in the idle mode (28). The transmission of media content to the first media playback device (any one of 58, 60, 62) on the broadcast video band frequency 64 is via a downlink broadcast, and this allows the first media playback device (any one of 58, 60, 62) to receive the transmitted video even when it is in the idle mode. The media content transmitted to the first playback device (any one of 58, 60, 62) may be stored in cache memory of the first media playback device (any one of 58, 60, 62) for lag-less playback of the media content on the first playback device (any one of 58, 60, 62). The cache memory may also aid in lag-less playback of the media content even during instances when the first media playback device (any one of 58, 60, 62) is involved with polling the mobile broadband frequency 66 for either events or notifications occurring on the mobile broadband frequency 66.

It is appreciated that the communications base station 56 is able to transmit video to a greater number of media playback devices in the idle mode compared to a lesser number of media playback devices in the active mode. This is because of a data load limitation of the communications base station 56, which enables a greater number of media playback devices in the idle mode (each media playback device has a lower bandwidth load on the communications base station 56) to be served compared to when the media playback devices are in the active mode (each media playback device has a higher bandwidth load on the communications base station 56). Thus, it is advantageous that more media playback devices may be served by the communications base station 56 when the media playback devices are in the idle mode.

In view of the preceding paragraphs, it should be noted that any communications base station may employ the method 20 to increase a number of media playback devices that is able to be served by the communications base station, especially in relation to the transmission of media content.

Figure 2:
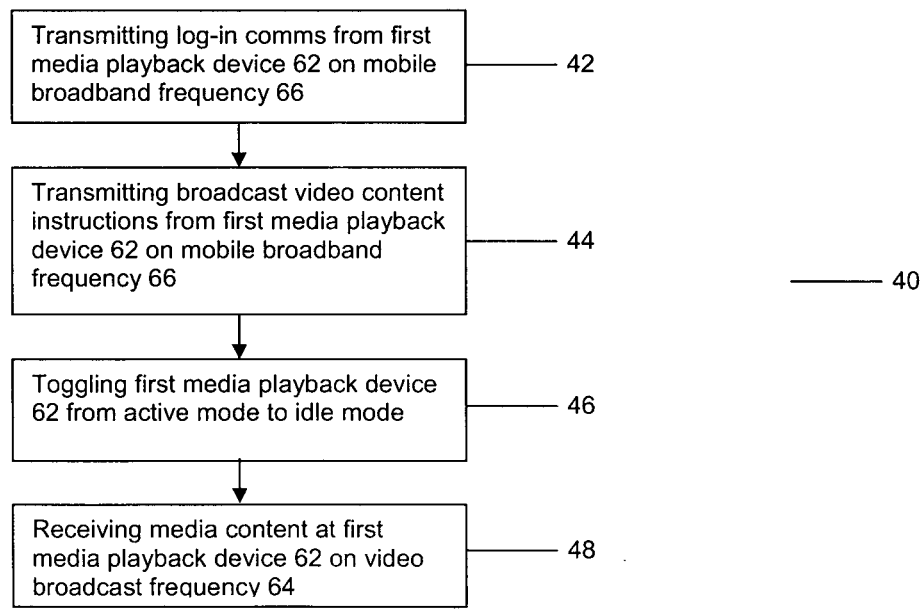
FIG. 2 shows a process flow for a second method for the present invention.

Reference is now made to FIGS. 2 and 3 in relation to another method 40 for increasing a number of media playback devices (58, 60, 62) served by the communications base station 56. FIG. 2 shows a process flow of the method 40 while FIG. 3 shows a system 50 which enables the method 40. It is appreciated that the communications base station 56 refers to a hub which allows users to access a data network 52, and may be configured to transmit data using a broadcast video band frequency 64 and both transmit and receive data using a mobile broadband frequency 66. Both the broadcast video band frequency 64 and the mobile broadband frequency 66 are selected from a data network such as, for example, WiMAX, HSxPA, HSPA+, LTE and so forth. In addition, the first media playback device may be a device such as, for example, a mobile phone (60 in FIG. 3), a media player (62 in FIG. 3), an e-book reader, a desktop computer (58 in FIG. 3), a portable computer and so forth. The first media playback device may be able to both transmit and receive data in an active mode, and only receive data in an idle mode.

The method 40 includes transmitting log-in communications from the first media playback device (any one of 58, 60, 62) to the communications base station 56 on the mobile broadband frequency 66 (42), with the first media playback device (any one of 58, 60, 62) being in an active mode during the log-in communications. The log-in communications may include both network entry and authentication processes. The log-in communications may enable a user of the first media playback device (any one of 58, 60, 62) to access the data network 52.

The method 40 then includes transmitting broadcast video content instructions from the first media playback device (any one of 58, 60, 62) to the communications base station 56 on the mobile broadband frequency 66 after the first media playback device is able to access the data network 52 served by the communications base station 56 (44). It is appreciated that the broadcast video content instructions include information on video channels such as, for example, frequency, decryption key, video parameters for each video channel and so forth. It is appreciated that the information on video channels may be stored in a configuration (config) file, the config file being stored at the communications base station 56. In this regard, varying the information on video channels stored in the config file would affect at least one of the video channels. It is appreciated that the decryption key may be renewable after a pre-determined period of time for digital rights management issues. The decryption key may also be locked-in with the first media playback device (any one of 58, 60, 62) in order to prevent unauthorized distribution of the decryption key.

Subsequently, the method 40 includes toggling the first media playback device (any one of 58, 60, 62) to the idle mode (46). Toggling the first media playback device (any one of 58, 60, 62) from the active mode to the idle mode may be carried out either when the first media playback device (any one of 58, 60, 62) transmits the broadcast video content instructions to the communications base station 56 or manually by a user of the first media playback device (any one of 58, 60, 62).

One manner of toggling the mode of the first media playback device (any one of 58, 60, 62) would be where the first media playback device (any one of 58, 60, 62) toggled (possibly by software) from the active mode to the idle mode at a juncture where the broadcast video content instructions are transmitted from the first media playback device (any one of 58, 60, 62). Alternatively, transmitting the broadcast video content instructions from the first media playback device (any one of 58, 60, 62) may cause an acknowledgement signal to be sent from the communications base station 56 when the broadcast video content instructions are received at the communications base station 56, and receipt of the acknowledgement signal from by the first media playback device (any one of 58, 60, 62) may cause the first media playback device (any one of 58, 60, 62) to be toggled to the idle mode (possibly also by software).

In relation to an example for the manual toggling of the modes, the user of the first media playback device (any one of 58, 60, 62) may be prompted by any means to toggle the first media playback device (any one of 58, 60, 62) to the idle mode at a juncture when the broadcast video content instructions are transmitted to the communications base station 56.

The method 40 also includes receiving media content at the first media playback device (any one of 58, 60, 62) on the broadcast video band frequency 64 when the first media playback device (any one of 58, 60, 62) is in the idle mode (48). The reception of media content at the first media playback device (any one of 58, 60, 62) on the broadcast video band frequency 64 is via a downlink broadcast, and this allows the first media playback device (any one of 58, 60, 62) to receive the transmitted video even when it is in the idle mode. The media content received by the first playback device (any one of 58, 60, 62) may be stored in cache memory of the first media playback device (any one of 58, 60, 62) for lag-less playback of the media content on the first playback device (any one of 58, 60, 62). The cache memory may also aid in lag-less playback of the media content even during instances when the first media playback device (any one of 58, 60, 62) is involved with polling the mobile broadband frequency 66 for either events or notifications occurring on the mobile broadband frequency 66.

It is appreciated that the communications base station 56 is able to transmit video to a greater number of media playback devices in the idle mode compared to a lesser number of media playback devices in the active mode. This is because of a data load limitation of the communications base station 56, which enables a greater number of media playback devices in the idle mode (each media playback device has a lower bandwidth load on the communications base station 56) to be served compared to when the media playback devices are in the active mode (each media playback device has a higher bandwidth load on the communications base station 56). Thus, it is advantageous that more media playback devices may be served by the communications base station 56 when the media playback devices are in the idle mode.

In view of the preceding paragraphs, it should be evident that any media playback device may employ the method 40 to increase a number of media playback devices that is able to be served by a communications base station, especially in relation to the transmission of media content.

Whilst there has been described in the foregoing description preferred embodiments of the present invention, it will be understood by those skilled in the technology concerned that many variations or modifications in details of design or construction may be made without departing from the present invention.

The invention claimed is:

1. A method for increasing a number of media playback devices served by a communications base station, the communications base station being for transmitting data using a broadcast video band frequency and both transmitting and receiving data using a mobile broadband frequency, the method including:
   receiving log-in communications from a first media playback device at the communications base station on the mobile broadband frequency, the first media playback device being in an active mode, in which data is transmitted and received, during the log-in communications;
   receiving broadcast video content instructions from the first media playback device at the communications base station on the mobile broadband frequency after the first media playback device is able to access a data network served by the communications base station;
   toggling the first media playback device to an idle mode in which data is received but not transmitted by the first media playback device; and
   transmitting media content to the first media playback device on the broadcast video band frequency when the first media playback device is in the idle mode,
   wherein the communications base station is able to serve a greater number of media playback devices in the idle mode compared to a lesser number of media playback devices in the active mode, and
   wherein toggling the first media playback device from the active mode to the idle mode is carried out when the first media playback device transmits the broadcast video content instructions.

2. The method of claim 1, wherein the log-in communications includes both network entry and authentication processes.

3. The method of claim 1, wherein the broadcast video content instructions include information on video channels selected from the group consisting of: frequency, decryption key, and video parameters for each video channel.

4. The method of claim 1, wherein toggling the first media playback device from the active mode to the idle mode is further carried out manually by a user of the first media playback device.

5. The method of claim 4, wherein transmitting the broadcast video content instructions from the first media playback device causes an acknowledgement signal to be sent from the communications base station when the broadcast video content instructions are received at the communications base station.

6. The method of claim 1, wherein the transmission of media content to the first media playback device on the broadcast video band frequency is via a downlink broadcast.

7. The method of claim 1, wherein the first media playback device is a device selected from the group consisting of: a mobile phone, a media player, an e-book reader, a desktop computer, and a portable computer.

8. The method of claim 1, wherein the media content transmitted to the first playback device is stored in cache memory of the first media playback device for lag-less playback of the media content on the first playback device.

9. The method of claim 4, wherein the user is prompted to toggle the first media playback device to the idle mode at a juncture when the broadcast video content instructions are transmitted.

10. A method for increasing a number of media playback devices served by a communications base station, the communications base station being for transmitting data using a broadcast video band frequency and both transmitting and receiving data using a mobile broadband frequency, the method including:
    transmitting log-in communications from a first media playback device to the communications base station on the mobile broadband frequency, the first media playback device being in an active mode, in which data is transmitted and received, during the log-in communications;
    transmitting broadcast video content instructions from the first media playback device to the communications base station on the mobile broadband frequency after the first media playback device is able to access a data network served by the communications base station;
    toggling the first media playback device to an idle mode in which data is received but not transmitted by the first media playback device; and
    receiving media content at the first media playback device on the broadcast video band frequency when the first media playback device is in the idle mode,
    wherein a greater number of media playback devices in the idle mode is able to be served by the communications base station compared to a lesser number of media playback devices in the active mode, and
    wherein toggling the first media playback device from the active mode to the idle mode is carried out when the first media playback device transmits the broadcast video content instructions.

11. The method of claim 10, wherein the log-in communications includes both network entry and authentication processes.

12. The method of claim 10, wherein the broadcast video content instructions include information on video channels selected from the group consisting of: frequency, decryption key, and video parameters for each video channel.

13. The method of claim 10, wherein toggling the first media playback device from the active mode to the idle mode is further carried out manually by a user of the first media playback device.

14. The method of claim 13, wherein transmitting the broadcast video content instructions from the first media playback device causes an acknowledgement signal to be sent from the communications base station when the broadcast video content instructions are received at the communications base station.

15. The method of claim 10, wherein the transmission of media content to the first media playback device on the broadcast video band frequency is via a downlink broadcast.

16. The method of claim 10, wherein the first media playback device is a device selected from the group consisting of: a mobile phone, a media player, an e-book reader, a desktop computer, and a portable computer.

17. The method of claim 10, wherein the media content received at the first playback device is stored in cache memory of the first media playback device for lag-less playback of the media content on the first playback device.

* * * * *